Jan. 4, 1927.
C. C. DAVIS
PIE CONFORMER
Original Filed June 18, 1924
1,613,223
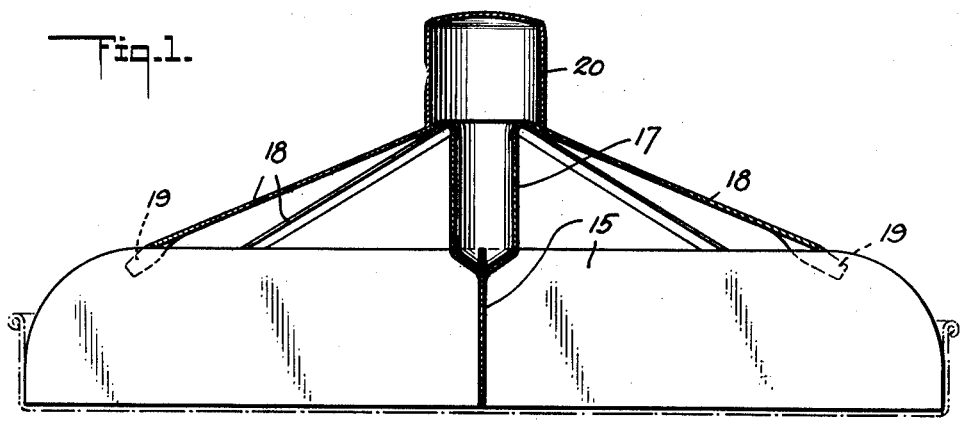
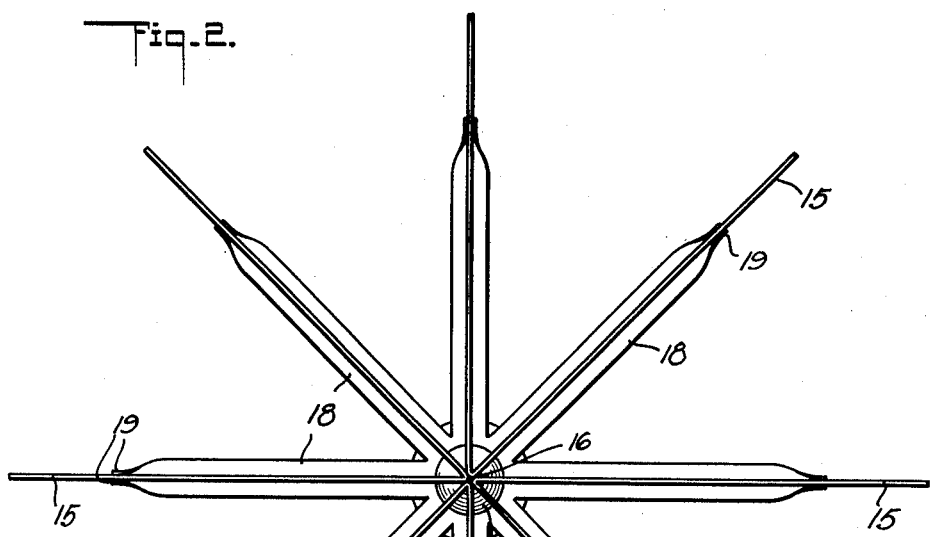
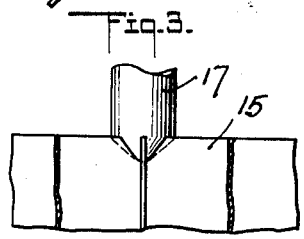
Inventor
CILVIA C. DAVIS
By Munn &Co.
Attorneys Patented Jan. 4, 1927.

1,613,223

UNITED STATES PATENT OFFICE.

CILVIA C. DAVIS, OF LOS ANGELES, CALIFORNIA.

PIE CONFORMER.

Application filed June 18, 1924, Serial No. 720,809. Renewed July 19, 1926.

My invention relates to pie conforming devices for dividing pies and other forms of pastry into slices or sectors.

A purpose of my invention is the provision of a pie conformer of extremely simple, inexpensive and durable construction which is adapted to be placed in a conventional pie pan prior to the baking of the pie and to remain in the pan during the baking operation, whereby it functions to divide the pie into a number of sectors to eliminate subsequent cutting, and to facilitate uniform baking by distributing the heat interiorly of the pie.

It is also a purpose of my invention to provide a pie conformer which comprises a plurality of radially extending blades of sufficient width to extend completely through the pie and exteriorly thereof so as to conduct the heat generated in an oven interiorly of the pie.

Further, my invention provides radial blades formed in pairs, and means for rigidly connecting the blades so as to maintain the same in proper radial position.

I will describe only one form of pie conformer embodying my invention, and will then point out the novel features thereof in claims.

In the drawings—

Figure 1 is a view showing in vertical section one form of pie conformer embodying my invention;

Figure 2 is a bottom plan view of the pie conformer shown in Figure 1;

Figure 3 is a fragmentary view showing in side elevation the manner in which the blades and bars are associated with the post of the conformer shown in the preceding views.

Referring specifically to the drawings, in which similar reference characters refer to similar parts, my invention in its present embodiment comprises a series of spaced blades 15 extending radially from a common axis and formed of sheets of metal or other suitable material of sufficient width to project above a pie pan, as illustrated in dash lines in Figure 1, and exteriorly of a pie contained in the pan. These blades 15 are formed in pairs, each pair being constructed from a single length of metal bent medially of its ends at the point indicated at 16 to provide two blades which diverge from their point of connection, as clearly illustrated in Figure 2.

The several pairs of blades 15 are rigidly secured to each other at the point 16 by solder or other suitable means, and to a tubular post 17 also formed of metal and having its lower end split at intervals to receive the upper edges of the inner ends of the blades whereupon, by soldering, the blades can be permanently secured to the post.

To prevent accidental disconnection of the pairs of blades from each other and from the post 17, I provide brace bars 18 split and bent at their ends to provide companion lips 19 between which are received the upper edges of the blades so that by welding the lips to the blades a permanent connection between the bars and blades is obtained. As clearly shown in Figure 1, these blades extend radially and downwardly from the upper end of the post 17, and in the present instance these bars are formed integral with the post 17. In forming the bars a metal tube of suitable length is split longitudinally at intervals corresponding to the width of the bars, and the bars so formed are bent outwardly and downwardly, it being understood that the remainder of the tube forms the post 17. The bars 18 are rigidly held in proper position by a head 20 also formed of metal and cup shaped, with its lower edge soldered to the several bars 18 at points spaced from the points of connection of the bars with the post 17.

In practice, the pie material is first placed in the pie pan, and the conformer then pressed downwardly through the material so that the blades penetrate the same, including the bottom layer of dough. With the conformer in this position the pie pan is introduced into the oven and the pie baked, with the blades of the conformer exposed to the heat of the oven and thus serving to conduct the heat interiorly of the pie to facilitate thorough and uniform baking. Upon completion of the baking operation the conformer is removed, thus leaving the pie divided into a plurality of sectors for serving. It will be noted that the blades of the conformer transmit heat to the meeting edges of the pie sectors, thus drying the filling material sufficiently to maintain the same between the crusts of the pie.

Although I have herein shown and described only one form of pie conformer embodying my invention, it is to be understood that various changes and modifications may be made herein without departing from the spirit of the invention and the spirit and scope of the appended claims.

What I claim is:

1. A pie conformer comprising radially disposed blades formed in pairs with the blades of each pair adjacent to each other, and means for rigidly connecting the blades of one pair to those of adjacent pairs.

2. A pie conformer comprising a post having one end split at intervals, radially disposed blades extending into the post through the split portions and secured to the post, and brace bars formed integral with the post and secured to the blades adjacent their outer ends.

3. A pie conformer comprising a post having one end split at intervals, radially disposed blades extending into the post through the split portions and secured to the post, brace bars integral with the post and secured to the blades adjacent their outer ends, and a head exceeding in cross sectional area that of the post and secured to the bars.

4. A pie conformer comprising a post split at intervals at its lower end, blades formed in pairs and extending radially from the post, said blades being extended through the split portions of the post and soldered thereto, radially disposed brace bars formed integral with and extending downwardly from the upper end of said post, the outer ends of said bars being split and bent to provide companion lips which are secured to the blades, and a head secured to the brace bars at points spaced from the post.

5. A pie conformer comprising a post, blades extending radially from one end of the post, and radially disposed brace bars formed integral with the post and rigidly connected to the blades.

6. A pie conformer comprising a post, blades extending radially from one end of the post, radially disposed brace bars integral with the post and connected to the blades, and a head connected to the bars.

CILVIA C. DAVIS.